United States Patent [19]

Lepage

[11] Patent Number: 5,688,903

[45] Date of Patent: Nov. 18, 1997

[54] PROCESS FOR THE PREPARATION OF POLYCONDENSATES OF AMINO ACIDS AND THE BIODEGRADABLE POLYPEPTIDE HYDROLYSATES THEREOF, AND THEIR USE IN DETERGENT COMPOSITIONS

[75] Inventor: Jean-Luc Lepage, Francheville, France

[73] Assignee: Rhone-Poulenc Chimie, Courbevoie, France

[21] Appl. No.: 535,437

[22] Filed: Sep. 29, 1995

[30] Foreign Application Priority Data

Oct. 12, 1994 [FR] France ................... 9412150

[51] Int. Cl.⁶ .................................... C08G 69/10
[52] U.S. Cl. .......................... 528/328; 578/398
[58] Field of Search .......................... 528/328, 398

[56] References Cited

U.S. PATENT DOCUMENTS

| | | | |
|---|---|---|---|
| 3,927,204 | 12/1975 | Neri | 424/78 |
| 5,142,062 | 8/1992 | Knebel | 548/545 |
| 5,457,176 | 10/1995 | Alder et al. | 528/328 |
| 5,478,919 | 12/1995 | Koskan et al. | 528/363 |
| 5,548,036 | 8/1996 | Kroner et al. | 528/328 |

FOREIGN PATENT DOCUMENTS

| | | | |
|---|---|---|---|
| 2 032 470 | 1/1971 | Germany | C08G 69/10 |
| 2 246 786 | 2/1992 | United Kingdom . | |
| WO 92/14753 | 9/1992 | WIPO . | |
| WO 93/04108 | 3/1993 | WIPO . | |

*Primary Examiner*—Nathan M. Nutter
*Attorney, Agent, or Firm*—John Daniel Wood

[57] ABSTRACT

Process for the preparation of polycondensates of amino acids or of the polypeptide hydrolysates thereof, by bulk thermal polycondensation of amino acids in pulverulent medium, in the presence of phosphoric acid, phosphorus pentoxide or polyphosphoric acid (catalyst) which is uniformly distributed in the said pulverulent medium, optionally followed by hydrolysis. The said pulverulent medium may be obtained by empasting the amino acid and the catalyst with water, removal of the water and grinding.

Use of polyimide polycondensates or the polypeptide hydrolysates thereof in detergent compositions.

7 Claims, No Drawings

PROCESS FOR THE PREPARATION OF POLYCONDENSATES OF AMINO ACIDS AND THE BIODEGRADABLE POLYPEPTIDE HYDROLYSATES THEREOF, AND THEIR USE IN DETERGENT COMPOSITIONS

The present invention relates to a process for the preparation of polycondensates of amino acids or of the biodegradable polypeptide hydrolysates thereof by thermal polycondensation of amino acids in pulverulent medium in the presence of small amounts of phosphoric acid, of phosphorus pentoxide or of polyphosphoric acid, optionally followed by hydrolysis.

BACKGROUND OF THE INVENTION

It is known to prepare polyanhydroaspartic acid by thermal polycondensation of aspartic acid in the presence of phosphoric acid, phosphorus pentoxide or polyphosphoric acid.

It has been proposed to work at atmospheric pressure in order to obtain polysuccinimides of limited molar mass or at reduced pressure in order to obtain polysuccinimides of high molar mass.

S. W. Fox and K. Harada (A Laboratory Manual of Analytical Methods of Protein Chemistry, including Polypeptides—Pergamon Press, Elmsford, N.Y.—1966—p.129) teach that at atmospheric pressure, in the presence of $H_3PO_4$, the optimum yields are obtained at 180° C. with an $H_3PO_4$/aspartic acid molar ratio of 3/4; in the case of an aspartic acid/glutamic acid mixture in a 2/1 molar ratio, the best results are obtained with an $H_3PO_4$/aspartic acid+glutamic acid molar ratio of 2/3.

S. W. Fox and K. Harada also propose, in U.S. Pat. No. 3,052,655, to polycondensate, at atmospheric pressure and at a temperature of 150°–210° C., an aspartic acid/glutamic acid mixture in a 1/1 molar ratio in the presence of an equimolar amount of $H_3PO_4$.

Patent Application FR-A-2,059,475 describes the condensation under reduced pressure, in a thin layer, of aspartic acid at a temperature of 170°–200° C., in the presence of $H_3PO_4$ according to an 85% $H_3PO_4$/aspartic acid weight ratio of 0.5.

P. Neri, G. Antoni, F. Benvenuti, F. Cocola and G. Gazzei (Journal of Medicinal Chemistry, 1973, Vol. 16, No. 8) have studied the influence of the $H_3PO_4$/aspartic acid molar ratio on the viscosity of the polysuccinimide obtained by polycondensation at 180° C. under reduced pressure in a thin layer, the $H_3PO_4$/aspartic acid molar ratio ranging from 0.4/1 to 2/1.

Patent Application DD-A-262,665 describes the polycondensation under vacuum at 160°–200° C. of aspartic acid in the presence of polyphosphoric acid, with a polyphosphoric acid/aspartic acid ratio of 1/3 to 2/1.

It has been proposed in FR-A-2,665,166 to prepare polysuccinimides of very high molecular weight by polycondensation under vacuum at 100°–250° C. of aspartic acid in the presence of phosphoric acid, phosphorus pentoxide or polyphosphoric acid, according to a phosphoric acid, phosphorus pentoxide or polyphosphoric acid/aspartic acid ratio of 0.1/1 to 2/1, preferably 0.3/1 to 1/1. The operation occurs in two steps, the first consisting in preparing a polysuccinimide having a molecular weight of 10,000 to 100,000, the second consisting in mechanically breaking up the hard and compact reaction medium and in continuing the polycondensation.

All these processes have the drawback of using a large amount of phosphoric acid or polyphosphoric acid (to be removed subsequently), with the reaction medium passing through a more or less viscous phase, with considerable foaming (the foams need to be broken), and then solidification of the medium at the end of the polycondensation (obligatory final grinding). Such processes are difficult to carry out industrially.

The Applicant has found a procedure which allows amounts of phosphoric acid, phosphorus pentoxide or polyphosphoric acid appreciably lower than 40 mol % to be used without formation of foams and without the reaction medium setting to a solid.

SUMMARY OF THE INVENTION

According to the invention, the procedure in question is a process for the preparation of polycondensates of amino acids or of the polypeptide hydrolysates thereof, by bulk thermal polycondensation of amino acids in the presence of phosphoric acid, phosphorus pentoxide or polyphosphoric acid as polycondensation catalyst, optionally followed by hydrolysis, the said process being characterized in that the polycondensation operation is performed in pulverulent medium containing, per molecule of amino acid, of the order of 0.005 to 0.25 mol, preferably of the order of 0.01 to 0.18 mol, of catalyst uniformly distributed in the said medium.

DETAILED DESCRIPTION OF THE INVENTION

In the definition of a mole of catalyst, the elemental entity taken will be the molecule in the case of phosphoric acid and the P atom in the case of phosphorus pentoxide or polyphosphoric acid (one P atom being equivalent to one molecule of phosphoric acid).

In the definition of a mole of amino acid, the elemental entity taken will be the molecule.

Among the amino acids which may be used to perform the process of the invention, there may be mentioned aspartic acid or glutamic acid, taken alone or mixed together in any proportion or mixed with another amino acid (for example up to 15% by weight, preferably less than 5% by weight, of glycine, alanine, valine, leucine, isoleucine, phenylalanine, methionine, histidine, proline, lysine, serine, threonine, cysteine, etc.). The preferred amino acid is aspartic acid.

The thermal polycondensation operation may be performed at a temperature of the order of 150 to 220° C., preferably at a temperature of the order of 180° to 200° C. The said operation may be performed at a chosen temperature or according to a preestablished temperature profile.

This thermal polycondensation operation may be performed under vacuum (preferably above 1 mbar), at atmospheric pressure or optionally under pressure (for example up to 20 bar), depending on the desired molar mass.

Any means for introduction of the catalyst to the above mentioned levels allowing a pulverulent mixture to be obtained, in which the said catalyst is uniformly distributed, may be used.

Among the possible embodiments of the invention, there may be mentioned those in which the pulverulent reaction medium undergoing the polycondensation operation and containing the uniformly distributed catalyst is obtained by:

—empasting a mixture of amino acid and phosphoric acid or polyphosphoric acid with water, removal of the water by evaporation at atmospheric pressure or, preferably, under vacuum, followed by grinding of the mass obtained —solubilization in water, preferably hot water, of the amino acid and the phosphoric acid or polyphosphoric acid, followed by spraying of the solution —spraying of a suspension of amino acid in an aqueous solution of phosphoric acid or polyphosphoric acid —vaporization of an aqueous solution of phosphoric acid or polyphosphoric acid on a fluidized bed of amino acid —or co-grinding or micronization of the phosphorus pentoxide and the amino acid.

A particularly advantageous mode consists in using phosphoric acid or polyphosphoric acid as catalyst, in introducing the phosphoric acid or polyphosphoric acid into the amino acid, in homogenizing the mixture by empasting using an amount of water which is sufficient to obtain a homogeneous pasty medium (preferably of the order of 0.4 to 1 part by weight of water per 1 part by weight of amino acid), in removing the excess water from the mixture by drying at atmospheric pressure or, preferably, under vacuum (generally below 10,000 Pa), in grinding the mass obtained in order to obtain a pulverulent medium, and then in performing the polycondensation operation.

The term "excess water" is understood to mean the water which is not in equilibrium with the phosphoric acid or polyphosphoric acid at the drying temperature and pressure.

The polyimide obtained according to the process of the invention may, if necessary, be separated out, filtered off, purified and dried.

The catalyst may, if desired, be separated from the polyimide by washing with water or using a solvent for the catalyst which is a non-solvent for the polyimide.

The polyimide may be purified by solubilization using a polar aprotic solvent (dimethylformamide, formamide, dimethyl sulphoxide, etc.) followed by reprecipitation using a non-solvent compound for the said polyimide (water, ether, ethanol, acetone, etc.).

The polyimide obtained, which may or may not have been separated out, may then be hydrolysed, preferably by addition of a basic agent (alkali metal or alkaline-earth metal base, alkali metal or alkaline-earth metal carbonate, etc.) in the presence of water, if necessary, in a homogeneous or two-phase medium; in the case of the polysuccinimide derived from aspartic acid, the hydrolysate thus obtained consists of polyaspartate (sodium polyaspartate for example).

The acid form of the hydrolysate may be obtained, for example, by neutralization of the salt obtained above by alkaline hydrolysis, using an organic or inorganic acid (HCl in particular); in the case of the polysuccinimide derived from aspartic acid, the hydrolysate thus obtained consists of polyaspartic acid.

According to the invention, the term "hydrolysate" refers to the product obtained by partial or total hydrolysis (by the action of water) of the polyimide formed; this hydrolysis leads, via opening of the imide rings, to the formation of amide functions, on the one hand, and carboxylic acid functions or carboxylic acid salts, on the other hand.

The products obtained according to the process of the present invention may be used especially as biodegradable polypeptide agent or co-agent for enhancing the performance of the surface agents (agent or co-agent referred to as "builder" or "cobuilder") in detergent compositions (laundry washing products, dishwasher washing products or any other washing product for domestic use).

The examples which follow are given as a guide.

The viscosity index (IV) given in these examples is measured using a SCHOTT AVS 350 capillary viscometer, starting with:

—either an amount of polysuccinimide (PSI) dissolved in 0.5N sodium hydroxide so as to have a concentration of 0.002 g/ml at a temperature of 25° C. (viscosity index VI1)

—or an amount of polysuccinimide (PSI) dissolved in dimethylformamide to a concentration of 0.005 g/ml at a temperature of 25° C. (viscosity index VI2)

In these examples, the biodegradability of the hydrolysates is measured according to AFNOR standard T90-312 (in accordance with International standard ISO 7827 of 15 Oct. 1984).

The test is carried out using:

—an inoculum obtained by filtration of inlet water of the municipal purification plant of Saint Germain au Mont d'Or (Rhône), as it is or after adaptation —a test medium containing $4 \times 10^5$ bacteria/ml —an amount of product to be tested such that the test medium contains an organic carbon concentration of the order of 40 ml/g.

The degree of biodegradability is measured as a function of time under the conditions of discharge into river water.

For this measurement, the samples tested were obtained by hydrolysis of a dilute sodium hydroxide solution of the polysuccinimides prepared, until an approximately 6% sodium polyaspartate solution, with a pH of the order of 9 to 11, was obtained.

The level of biodegradability is characterized by the following two parameters:

● the maximum rate of biodegradation (MRB)
● the time necessary to pass from a biodegradation rate of 10% to a rate of 90% of the maximum rate of biodegradation (t 10–90).

Measurement of the coloration according to the HUNTER L.a.b. method

The coloration of the polysuccinimide powders or of the hydrolysates thereof is determined by measurement on an ACS SPECTRO-SENSOR II® spectrocolorimeter.

—Measurement conditions:

● light source: D 65
● observation angle: 2°

The 3 values measured are:

● L: Luminanee, which ranges between 0 (black) and 100 (white)
● a: Coloration, red (a positive)/green (a negative)
● b: Coloration, yellow (b positive)/blue (b negative)

These values are calculated from the measurements according to the formulae $$L = 100 \, (Y/Yo)^{1/2} \quad a = Ka \, (X/Xo - Y/Yo)/(Y/Yo)^{1/2} \quad b = Kb \, (Y/Yo - Z/Zo)/(Y/Yo)^{1/2}$$

X, Y, Z: tristimulus values corresponding to the 3 primary colours obtained with the sample;

Xo, Yo, Zo: tristimulus values of the perfect diffuser of the source used;

Ka, Kb: coefficients for the source used.

EXAMPLE 1

A pulverulent reaction mixture is prepared by:

—incorporation of 20 g of 85% orthophosphoric acid into 400 g of L-aspartic acid, with homogenization of the medium by empasting using 320 g of water, on an enamelled plate —then, evaporation of the water and drying in an oven under vacuum for 16 hours at 40° C. and 6,000 Pa and for 21 hours at 80° C. and 6,000 Pa —and grinding of the 416.7 g of mixture obtained, using an impact disc mill.

51.8 g of this pulverulent mixture are introduced into a 250 ml rotary evaporator flask preheated to 200° C. (temperature of the oil bath). The flask rotates at a speed of 20 revolutions/min.

After polycondensation for 4 hours at 200° C. and atmospheric pressure, there are recovered, without washing with water, 42.0 g of product, which corresponds to a yield of polyanhydroaspartic acid (polysuccinimide PSI) of 72.0% (confirmation by potentiometric assay).

No lumping together of the reaction mass was observed during the polycondensation operation.

The product has a viscosity index VI1=13.6 ml/g and a HUNTER coloration

L=91.2
a=1.3
b=10.2

EXAMPLE 2

A pulverulent reaction mixture is prepared by:

—incorporation of 80 g of 85% orthophosphoric acid into 800 g of L-aspartic acid, with homogenization of the medium by empasting using 640 g of water, on an enamelled plate —then, evaporation of the water and drying in an oven under vacuum for 20 hours at 40° C. and 6,000 Pa, 25 hours at 80° C. and 6,000 Pa and 2 hours at 80° C. and 650 Pa —and grinding of the 867.9 g of mixture obtained, using an impact disc mill.

53.4 g of this pulverulent mixture are introduced into a 250 ml rotary evaporator flask preheated to 200° C. (temperature of the oil bath). The flask rotates at a speed of 20 revolutions/min.

After polycondensation for 4 hours at 200° C. and atmospheric pressure, there are recovered, without washing with water, 41.0 g of product, which corresponds to a yield of polyanhydroaspartic acid (polysuccinimide PSI) of 92.0% (confirmation by potentiometric assay).

No lumping together of the reaction mass was observed during the polycondensation operation.

The product has a viscosity index VI1=15.7 ml/g and a HUNTER coloration

L=90.7
a=0.4
b=10.8

This polysuccinimide is hydrolysed as described above; the biodegradability of the hydrolysate is as follows:

MRB: 97%
t 10–90: 7 days

EXAMPLE 3

A pulverulent reaction mixture is prepared by:

—incorporation of 7.5 g of 85% orthophosphoric acid into 50 g of L-aspartic acid, with homogenization of the medium by empasting using 21 g of water, on a rotary evaporator fitted with a 250 ml flask —then, evaporation of the water and drying under vacuum on this rotary evaporator at 80° C., for 35 minutes at 4,600 Pa and for 4 hours at 1300 Pa —and grinding of the 56.3 g of mixture obtained, using a mortar.

55.2 g of this pulverulent mixture are introduced into a 250 ml rotary evaporator flask preheated to 200° C. (temperature of the oil bath). The flask rotates at a speed of 20 revolutions/min.

After polycondensation for 4 hours at 200° C. and atmospheric pressure, there are recovered, without washing with water, 42.3 g of product, which corresponds to a yield of polyanhydroaspartic acid (polysuccinimide PSI) of 100% (confirmation by potentiometric assay).

The medium is observed to lump together at the start of polycondensation, this lumping being eliminated by scratching the reaction mass; the test then takes place in pulverulent medium without any setting to a solid.

The product has a viscosity index VI1=14.7 ml/g and a HUNTER coloration

L=90.4
a=−0.7
b=11.1

EXAMPLE 4

A pulverulent reaction mixture is prepared by:

—incorporation of 2.5 g of 85% orthophosphoric acid into 50 g of L-aspartic acid, with homogenization of the medium by empasting using 20 g of water, on a rotary evaporator fitted with a 250 ml flask —then, evaporation of the water and drying under vacuum on this rotary evaporator at 80° C., for 20 minutes at 6,000 Pa and for 4 hours at 1300 Pa —and grinding of the 52.2 g of mixture obtained, using a mortar.

51.9 g of this pulverulent mixture are introduced into a 1 liter rotary evaporator flask preheated to 200° C. (temperature of the oil bath). The flask rotates at a speed of 20 revolutions/min.

After polycondensation for 6 hours at 180° C. and atmospheric pressure, there are recovered, without washing with water, 44.0 g of product, which corresponds to a yield of polyanhydroaspartic acid (polysuccinimide PSI) of 60% (confirmation by potentiometric assay).

No lumping together is observed during the polycondensation.

The product has a viscosity index VI2 of 12.9 and a HUNTER coloration

L=93.3
a=0.3
b=8.2

EXAMPLE 5

A pulverulent reaction mixture is prepared by:

—incorporation of 5.0 g of 85% orthophosphoric acid into 50 g of L-aspartic acid, with homogenization of the medium by empasting using 20 g of water, on a rotary evaporator fitted with a 250 ml flask —then, evaporation of the water and drying under vacuum on this rotary evaporator at 80° C., for 1 h 20 min at 8,000 Pa and for 2 h 30 min at 1300 Pa —and grinding of the 54.3 g of mixture obtained, using a mortar.

53.8 g of this pulverulent mixture are introduced into a 250 ml rotary evaporator flask preheated to 200° C.

(temperature of the bath). The flask rotates at a speed of 20 revolutions/min.

After polycondensation for 6 hours at 180° C. and atmospheric pressure, there are recovered, without washing with water, 42.0 g of product, which corresponds to a yield of polyanhydroaspartic acid (polysuccinimide PSI) of 91% (confirmation by potentiometric assay).

No lumping together is observed during the polycondensation.

The product has a viscosity index VI1 of 13.9 and a HUNTER coloration

L=94.1
a=−0.9
b=7.2

This polysuccinimide is hydrolysed as described above; the biodegradability of the hydrolysate is as follows:

MRB: 94%
t 10–90: 5 days

EXAMPLE 6

A pulverulent reaction mixture is prepared by:

—incorporation of 7.5 g of 85% orthophosphoric acid into 50 g of L-aspartic acid, with homogenization of the medium by empasting using 20.3 g of water, on a rotary evaporator fitted with a 250 ml flask —then, evaporation of the water under vacuum on this rotary evaporator at 80° C., for 30 min at 4,600 Pa and for 4 h at 650 Pa —and grinding of the 56.6 g of mixture obtained, using a mortar.

55.4 g of this pulverulent mixture are introduced into a 250 ml rotary evaporator flask preheated to 200° C. (temperature of the oil bath). The flask rotates at a speed of 20 revolutions/min.

After polycondensation for 6 hours at 180° C. and atmospheric pressure, there are recovered, without washing with water, 42.9 g of product, which corresponds to a yield of polyanhydroaspartic acid (polysuccinimide PSI) of 97% (confirmation by potentiometric assay).

The medium is observed to lump together at the start of polycondensation, this lumping together being eliminated by scratching the reaction mass; the test then takes place in pulverulent medium without any setting to a solid.

The product has a viscosity index VI1 of 14.7 and a HUNTER coloration

L=92.8
a=−0.9
b=8.8

EXAMPLE 7

A pulverulent reaction mixture is prepared by:

—incorporation of 20 g of 85% orthophosphoric acid into 400 g of L-aspartic acid, with homogenization of the medium by empasting using 320 g of water, on a rotary evaporator fitted with a 3 liter flask —then, evaporation of the water under vacuum on this rotary evaporator at 80° C., for 1 hour at 2,600 Pa and for 4 h 15 min at 1,300 Pa, followed by additional drying in an oven for 65 hours at 80° C. and 6,600 Pa —and grinding of the 413 g of mixture obtained, using a mortar.

50 g of this pulverulent mixture are introduced into a 250 ml rotary evaporator flask preheated to 200° C. (temperature of the oil bath). The flask rotates at a speed of 20 revolutions/min.

After polycondensation for 6 hours at 180° C. and under vacuum (1,300 Pa), there are recovered, without washing with water, 39.7 g of product, which corresponds to a yield of polyanhydroaspartic acid (polysuccinimide PSI) of 79% (confirmation by potentiometric assay).

No lumping together is observed during the polycondensation.

The product has a viscosity index VI1 of 33.6 and a HUNTER coloration

L=89.7
a=0.8
b=13.5

EXAMPLE 8

A pulverulent reaction mixture is prepared by:

—incorporation of 7.8 g of 85% orthophosphoric acid into 50 g of L-aspartic acid, with homogenization of the medium by empasting using 20 g of water, on a rotary evaporator fitted with a 250 ml flask —then, evaporation of the water under vacuum on this rotary evaporator at 80° C., for 35 min at 4,600 Pa and for 4 h at 1,300 Pa —and grinding of the 56.3 g of mixture obtained, using a mortar.

55.5 g of this pulverulent mixture are introduced into a 250 ml rotary evaporator flask preheated to 200° C. (temperature of the bath). The flask rotates at a speed of 26 revolutions/min.

After polycondensation for 3 hours at 200° C. and under vacuum (1,300 Pa), there are recovered, without washing with water, 41.8 g of product, which corresponds to a yield of polyanhydroaspartic acid (polysuccinimide PSI) of 100% (confirmation by potentiometric assay).

The medium is observed to lump together at the start of polycondensation, this lumping together being eliminated by scratching the reaction mass; the test then takes place in pulverulent medium without any setting to a solid.

The product has a viscosity index VI2=16.6 ml/g and a HUNTER coloration

L=89.7
a=−0.5
b=14.3

Comparative Example 9

The following are introduced into a 2 liter rotary evaporator flask

—50 g of L-aspartic acid
—25 g of 85% phosphoric acid

The reactants are heated at 180° C. (temperature of the oil bath) at atmospheric pressure for 4 hours, the speed of rotation of the flask being 90 revolutions/min (speed required to avoid foaming of the reaction medium; at low spin speed, for example 20 revolutions/min, the foam overflows from the flask).

During the polycondensation operation, the formation of a viscous intermediate phase, a slight expansion, and then the setting of the reaction medium to a solid are observed.

The reaction mass obtained is ground in a mortar and then washed with 3×1.8 liters of water, followed by drying for 31 hours at 60° C. and 8,000 Pa.

34.85 g of PSI are recovered (equivalent to a yield of 95.6%).

The product has a viscosity index VI2 equal to 11.3 ml/g and a HUNTER coloration

L=92.0 a=−0.3 b=6.9

Comparative Example 10

The following are introduced into a 2 liter rotary evaporator flask

—50 g of L-aspartic acid

—25 g of 85% phosphoric acid

The reactants are heated at 180° C. (temperature of the oil bath) at 1,300 Pa for 2 h 35 min, the speed of rotation of the flask being 90 revolutions/min (speed required to avoid foaming of the reaction medium).

During the polycondensation operation, the formation of a viscous intermediate phase and then the setting of the reaction medium to a solid are observed.

The reaction mass obtained is ground in a mortar and then washed with 3×1.6 liters of water, followed by drying for 51 hours at 60° C. and 8,000 Pa.

37.2 g of PSI are recovered (equivalent to a yield of 100%).

The product has a viscosity index VI2 equal to 32.5 ml/g and a HUNTER coloration

L=88.8 a=−0.0 b=11.6

I claim:

1. A process for the preparation of polycondensates of amino acids or of the polypeptide hydrolysates thereof comprising preparing said polycondensates by bulk thermal polycondensation of amino acids in the presence of a polycondensation catalyst, of phosphoric acid, phosphorus pentoxide or polyphosphoric acid optionally followed by hydrolysis, the said polycondensation process being performed in pulverulent medium containing, per mole of amino acid, from 0.005 to 0.25 mole of catalyst uniformly distributed in the said medium.

2. A process according to claim 1, wherein said catalyst is used in an amount from 0.01 to 0.18 mole per mole of amino acid.

3. A process according to claim 1, wherein the amino acid is aspartic acid or glutamic acid or mixtures thereof in any proportions, or mixed with another amino acid.

4. A process according to claim 1, wherein the thermal polycondensation process is performed at a temperature of from 150° to 220° C.

5. A process according to claim 4, wherein the temperature ranges from 180° to 200° C.

6. A process according to claim 1, wherein the polycondensate obtained by the thermal polycondensation is hydrolyzed to a polypeptide salt by addition of a basic agent, the said salt being optionally neutralized to a polypeptidic acid by addition of an inorganic or organic acid.

7. A process according to claim 1, wherein use of the polycondensates or the hydrolysates thereof which are obtained are used as biodegradable polypeptide agents or co-agents for enhancing the surface properties of surfactant agents in detergent compositions.

\* \* \* \* \*